US010771405B2

(12) United States Patent
Levy-Abegnoli et al.

(10) Patent No.: US 10,771,405 B2
(45) Date of Patent: Sep. 8, 2020

(54) SWITCHING AND LOAD BALANCING TECHNIQUES IN A COMMUNICATION NETWORK

(71) Applicant: Cisco Technology, Inc., San Jose, CA (US)

(72) Inventors: Eric M. Levy-Abegnoli, Valbonne (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 26 days.

(21) Appl. No.: 16/172,598

(22) Filed: Oct. 26, 2018

(65) Prior Publication Data
US 2020/0136999 A1    Apr. 30, 2020

(51) Int. Cl.
*H04L 12/861* (2013.01)
*H04L 12/803* (2013.01)
(Continued)

(52) U.S. Cl.
CPC .......... *H04L 49/9089* (2013.01); *H04L 47/11* (2013.01); *H04L 47/125* (2013.01); *H04L 49/25* (2013.01); *H04L 49/501* (2013.01)

(58) Field of Classification Search
CPC ... H04L 49/9089; H04L 49/25; H04L 47/125; H04L 47/11; H04L 49/501; H04L 43/026; H04L 43/02; H04L 41/12; H04L 41/0853; H04L 43/062; H04L 43/045; H04L 43/50; H04L 41/22; H04L 43/028; H04L 43/14; H04L 12/1886; H04L 2012/5684; H04L 29/06897; H04L 45/304; H04L 45/3065; H04L 47/24; H04L 47/00; H04L 47/22; H04L 47/80; H04L 49/206; H04L 47/2483; H04L 45/38; H04L 47/10; H04L 47/18; Y02D 50/30
(Continued)

(56) References Cited

U.S. PATENT DOCUMENTS 7,284,047 B2 * 10/2007 Barham ................. H04L 29/06
370/230.1
7,590,136 B1 * 9/2009 Parker ..................... H04L 45/06
370/359
(Continued)

OTHER PUBLICATIONS

Popovic et al, "iPRP—the Parallel Redundancy Protocol for IP Networks: Protocol Design and Operation," IEEE Transactions on Industrial Information, 2016, 13 pages.

*Primary Examiner* — Michael Won
(74) *Attorney, Agent, or Firm* — Patterson + Sheridan, LLP

(57) ABSTRACT

A source access network device multicasts copies of a packet to multiple core switches, for switching to a same target access network device. The core switches are selected for the multicast based on a load balancing algorithm managed by a central controller. The target access network device receives at least one of the copies of the packet and generates at least metric indicative of a level of traffic congestion at the core switches and feeds back information regarding the recorded at least one metric to the controller. The controller adjusts the load balancing algorithm based on the fed back information for selection of core switches for a subsequent data flow.

20 Claims, 8 Drawing Sheets

(51) Int. Cl.
*H04L 12/801* (2013.01)
*H04L 12/947* (2013.01)
*H04L 12/931* (2013.01)

(58) Field of Classification Search
USPC ....... 709/232, 234, 235, 238, 202, 203, 223, 709/224, 225, 241, 242, 244, 239
See application file for complete search history.

(56) References Cited

U.S. PATENT DOCUMENTS

| | | | |
|---|---|---|---|
| 8,264,959 B2 | 9/2012 | Licardie et al. | |
| 8,738,860 B1 * | 5/2014 | Griffin | G06F 12/0831 711/122 |
| 9,036,481 B1 * | 5/2015 | White | H04L 47/18 370/235 |
| 9,178,837 B2 | 11/2015 | Mishra et al. | |
| 9,602,593 B2 | 3/2017 | Yang | |
| 10,425,340 B2 * | 9/2019 | Avidar | H04L 47/125 |
| 10,608,939 B1 * | 3/2020 | Kim | H04L 47/33 |
| 2006/0056302 A1 * | 3/2006 | Ahn | H04L 45/00 370/238 |
| 2006/0176810 A1 * | 8/2006 | Kekki | H04L 47/20 370/229 |
| 2007/0280114 A1 * | 12/2007 | Chao | H04L 43/0888 370/235.1 |
| 2008/0240115 A1 * | 10/2008 | Briscoe | H04L 45/26 370/400 |
| 2009/0106571 A1 * | 4/2009 | Low | G06F 9/4856 713/310 |
| 2010/0214913 A1 * | 8/2010 | Kompella | H04L 45/125 370/230 |
| 2012/0257627 A1 * | 10/2012 | Nguyen | H04L 49/208 370/392 |
| 2014/0359271 A1 * | 12/2014 | Gedik | G06F 9/445 713/100 |
| 2015/0127797 A1 * | 5/2015 | Attar | H04L 47/125 709/223 |
| 2018/0270139 A1 | 9/2018 | Singh | |
| 2019/0182161 A1 * | 6/2019 | Ravi | H04L 47/263 |

\* cited by examiner

SWITCHING AND LOAD BALANCING TECHNIQUES IN A COMMUNICATION NETWORK

TECHNICAL FIELD

Embodiments of the present invention generally relate to communication networks and, more specifically, to switching and load balancing techniques in a communication network.

BACKGROUND

The data center is at the foundation of modern software technology, serving a critical role in expanding capabilities for enterprises. A data center design called the network-based spine-and-leaf architecture was developed to overcome several limitations of older network architectures. This architecture has been proven to deliver high-bandwidth, low-latency, and non-blocking server-to-server connectivity. In this two-tier Clos architecture, every lower-tier switch (leaf layer) is connected to each of the top-tier switches (spine layer) in a full-mesh topology. The leaf layer consists of access switches that connect to devices such as servers. The spine layer is the backbone of the network and is responsible for interconnecting all leaf switches. Every leaf switch connects to every spine switch in the fabric. The path is randomly chosen so that the traffic load is evenly distributed among the top-tier switches. If one of the top tier switches were to fail, it would only slightly degrade performance throughout the data center.

If oversubscription of a link occurs (that is, if more traffic is generated than can be aggregated on the active link at one time), the process for expanding capacity is straightforward. An additional spine switch can be added, and uplinks can be extended to every leaf switch, resulting in the addition of interlayer bandwidth and reduction of the oversubscription. If device port capacity becomes a concern, a new leaf switch can be added by connecting it to every spine switch and adding the network configuration to the switch. The ease of expansion optimizes the IT department's process of scaling the network. If no oversubscription occurs between the lower-tier switches and their uplinks, then a non-blocking architecture can be achieved.

With a spine-and-leaf architecture, no matter which leaf switch a server is connected, its traffic always has to cross the same number of devices to get to another server (unless the other server is located on the same leaf). This approach keeps latency at a predictable level because a payload only has to hop to a spine switch and another leaf switch to reach its destination.

DESCRIPTION OF EXAMPLE EMBODIMENTS

Overview

Figure 1:
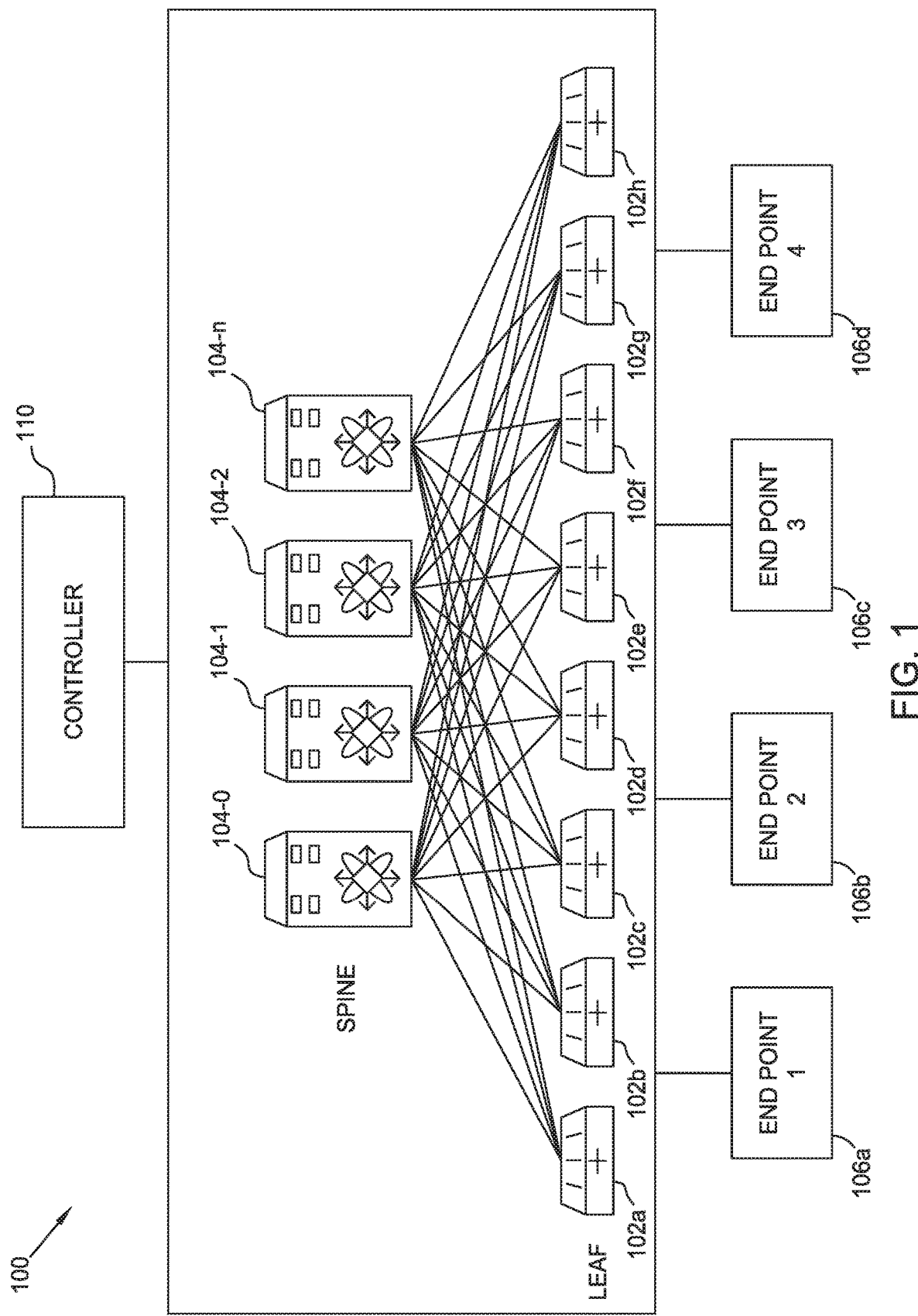
FIG. 1 illustrates an example leaf-spine architecture 100 for a data center in which aspects of the present disclosure may be practiced.

Aspects of the present disclosure provide a method for switching data in a communication network. The method generally includes obtaining at a source access network device a packet to send to a target access network device, wherein each of the source access network device and the target access network device is coupled to each of a plurality of core network devices; transmitting by the source access network device the packet to a first core network device for switching to the target access network device, wherein the first core network device is selected from the plurality of core network devices based on a load balancing algorithm configured by a controller; transmitting by the source access network device at least one copy of the packet to a respective second core network device for switching to the target access network device; receiving at the target access network device at least one of the packet or the at least one copy of the packet; recording by the target access network device based on the receiving, at least one metric indicative of a level of traffic congestion at the first and second core network devices; transmitting by the target access network device information regarding the recorded at least one metric to the controller; and adjusting by the controller the load balancing algorithm based on the information regarding the at least one metric Aspects of the present disclosure provide a communication network for switching data. The communication generally includes a controller for managing switching of traffic flows in the communication network; a plurality of core network devices; a source access network device; and a target access network device, wherein each of the source access network device and the target access network device is coupled to each of a plurality of core network devices. The source access network device is configured to obtain a packet to send to the target access network device, transmit the packet to a first core network device for switching to the target access network device, wherein the first core network device is selected from the plurality of core network devices based on a load balancing algorithm configured by a controller, and transmit at least one copy of the packet to a respective second core network device for switching to the target access network device. The target access network device is configured to record based on the receiving, at least one metric indicative of a level of traffic congestion at the first and second core network devices, and transmit information regarding the recorded at least one metric to the controller. The controller is configured to adjust the load balancing algorithm based on the information regarding the at least one metric.

Aspects of the present disclosure provide an apparatus for switching data in a communication network. The apparatus generally includes means for obtaining at a source access network device a packet to send to a target access network device, wherein each of the source access network device and the target access network device is coupled to each of a plurality of core network devices; means for transmitting by the source access network device the packet to a first core network device for switching to the target access network device, wherein the first core network device is selected from the plurality of core network devices based on a load balancing algorithm configured by a controller; means for transmitting by the source access network device at least one copy of the packet to a respective second core network device for switching to the target access network device; means for receiving at the target access network device at least one of the packet or the at least one copy of the packet; means for recording by the target access network device based on the receiving, at least one metric indicative of a level of traffic congestion at the first and second core network devices; means for transmitting by the target access network device information regarding the recorded at least one metric to the controller; and means for adjusting by the controller the load balancing algorithm based on the information regarding the at least one metric.

Example Embodiments

Leaf-spine fabrics generally include a central controller which receives statistics and other telemetry information from the fabric (spine and leaf switches) and pushes policies to the spine and leaf switches to obtain the desired behavior and performances. Thus, the controller receives some level of feedback from the switches including switch loading information. A load balancing algorithm may be selected based on the load information made available to the controller which the controller may push down to the leaf switches. The leaf switches may generally select a single spine switch based on the load balancing algorithm However, the load information regarding the spine switches fed back to the controller is very limited and not in real time and thus slow to react and adapt to changing traffic load situation in the spine. Since each of the spine switches may constantly receive and transmit traffic flows, the load at the spine switches is dynamic. These systems are not intelligent enough to dynamically evolve with the changing traffic situation at the various spine switches. Since, the limited feedback to the controller is not real time, the controller may not always have the most up to date load information and may not update the load balancing algorithm fast enough to select the most optimal spine switches for each data flow. Preferably, the load balancing algorithm adapts based on the changing traffic load situation in the network/switches. This is difficult or impossible without a feedback loop, which is not part of the many switching systems.

Aspects of the present disclosure discuss techniques for measuring traffic load at core network switches (e.g., spine switches) and tuning a load balancing algorithm based on the measured load information for selecting one or more optimal core network switches for switching traffic between access switches (e.g., leaf switches). The discussed techniques provide a feedback loop between the leaf-spine fabric and the controller to feed the controller with load information regarding spine switches. This feedback method for adaptive load balancing algorithm is much faster as compared to any of the current load balancing techniques. These techniques allow the leaf switches to provide feedback to the controller so that the controller can push the right algorithm (e.g., for more optimal selection of the spine switches) to the leaf switches at the right time.

FIG. 1 illustrates an example leaf-spine architecture 100 for a data center in which aspects of the present disclosure may be practiced.

As shown in FIG. 1, the leaf-spine architecture 100 includes a plurality of leaf switches 102 a-h (also referred to as access network switches or leaf), each leaf switch 102 coupled to each of a plurality of spine switches 104 0-n (also referred to as core network switches). The plurality of spine switches 104 together are often referred to as the spine of the leaf-spine fabric. End points 106 (e.g., end points 1-4 shown in FIG. 1) are coupled to the leaf switches, each end point 106 coupled to at least one of the leaf switches 102. Each of the end points 106 may include a server, a virtual machine, a software application, etc. In an aspect, each end point 106 communicates with another end point 106 using the leaf-spine fabric for routing data flows between the end points. The controller 110 is a central entity that manages and configures policies on each of the leaf and spine switches in the leaf-spine fabric.

In certain aspects, an example implementation of the leaf-spine architecture 100 shown in FIG. 1 is Cisco Application Centric Infrastructure (ACI) or Software Defined Network (SDN). The Cisco ACI fabric includes a leaf-spine architecture similar to the leaf-spine architecture 100 shown in FIG. 1. From a management perspective, the central Controller 110 (e.g., SDN controller) of the ACI solution, also referred as the Application Policy Infrastructure Controller (APIC) manages and configures the policy on each of the switches in the ACI fabric. Hardware is stateless in Cisco ACI. This means no configuration is tied to a device (e.g., leaf switch, spine switch etc.). The APIC acts as a central repository for all policies and has the ability to rapidly deploy and re-deploy hardware, as needed, by using this stateless computing model.

Cisco ACI also serves as a platform for other services that are required within the data center or cloud environment. Through the use of the APIC, third party services may be integrated for advanced security, load balancing, and monitoring. ACI is used as an example, the embodiments are not limited to such and can be used with any other suitable SDN platform.

In a switching fabric, when a leaf needs to send traffic upstream to reach another leaf via the spine, it can use a load balancing technique to select one of the spine switches. Various algorithms are applied to select the spine switch including static hash, Dynamic Load Balancing (DLB) based on congestion and Dynamic Packet Prioritization (DPP) that prioritizes short flows over large ones. Generally, the controller programs each leaf on how to select a spine switch for switching a data flow. However, once a particular spine switch is selected, and traffic of the data flow reaches it from the ingress leaf, if the spine switch is busy servicing some other flow, the traffic is queued at the spine switch which may delay the arrival time to a destination or egress leaf. At the same time some other switch may be available and may be able to switch the flow right away. While, DLB algorithms attempt to select a least loaded spine switch, they cannot take instant feedback from the switches regarding their load levels. This often leads to the DLB not selecting the most optimal spine switch to switch a data flow.

Leaf-spine fabrics are also SDN constructs in which the central controller (e.g., Controller 110 of FIG. 1) receives statistics and other telemetry information from the fabric (spine and leaf switches) and pushes policies to the spine and leaf switches to obtain the desired behavior and performances. Thus, the controller receives some level of feedback from the switches including switch loading information. The load balancing algorithm may be selected based on the load information made available to the controller which the controller may push down to the leaf switches.

However, the load information regarding the spine switches fed back to the controller is very limited and not in real time and thus slow to react and adapt to changing traffic load situation in the spine. Since each of the spine switches may constantly receive and transmit traffic flows, the load at the spine switches is dynamic. These systems are not intelligent enough to dynamically evolve with the changing traffic situation at the various spine switches. Since, the limited feedback to the controller is not real time, the controller may not always have the most up to date load information and may not update the load balancing algorithm fast enough to select the most optimal spine switches for each data flow. Preferably, the load balancing algorithm adapts based on the changing traffic load situation in the network/switches. This is difficult or impossible without a feedback loop, which is not part of the many switching systems.

Aspects of the present disclosure discuss techniques for measuring traffic load at core network switches (e.g., spine switches) and tuning a load balancing algorithm based on the measured load information for selecting one or more optimal core network switches for switching traffic between access switches (e.g., leaf switches). The discussed techniques provide a feedback loop between the leaf-spine fabric and the controller to feed the controller with load information regarding spine switches. This feedback method for adaptive load balancing algorithm is much faster as compared to any of the current load balancing techniques. These techniques allow the leaf switches to provide feedback to the controller so that the controller can push the right algorithm (e.g., for more optimal selection of the spine switches) to the leaf switches at the right time.

While aspects of the present disclosure are discussed with reference to the spine-leaf architecture, the techniques discussed herein are not limited to the spine-leaf architecture. The techniques may be extended to any network architecture in which access network devices need to communicate with each other via a plurality of core network devices providing redundancy in terms of the path a data flow may take between two access network devices.

In certain aspects, the network is tested periodically or in response to certain triggers to determine load at one or more spine switches and the determined load information is fed back to the controller for adjusting the load balancing algorithm. In certain aspects, to test the network for spine load, a source leaf node transmits a frame/packet (e.g., part of a traffic flow) to a spine switch selected based on a load balancing algorithm configured by the controller, for switching to a target leaf node. The leaf further generates copies of the frame by replicating the original packet and transmits a replicated frame to at least one additional spine switch, for switching to the same target leaf node. In certain aspects, unlike load balancing algorithms which select a single primary spine switch (e.g., 1 among n spine switches) to switch traffic, the load balancing algorithm in accordance with aspects of the present disclosure enables the leaf switch to select secondary spine switches (e.g., x among n spine switches) for transmitting replicated frames. In an aspect, the controller sends to the leaf switches, the load balancing algorithm allowing each leaf switch to select the primary and secondary spine switches for switching a data flow. In certain aspects, a redundancy protocol such as Parallel Redundancy Protocol (PRP) may be used to replicate and transmit traffic to multiple spine switches.

The target leaf may receive multiple copies of the same frame from the different spine switches at different times based on a load of the respective switching spine switch and may gather metrics indicating spine loading based on the received frames. For example, the later a frame is received, the more a spine switch forwarding the frame is congested. The target leaf may feedback the information regarding the collected metrics to the controller. The controller may adjust the load balancing algorithm based on the received metrics information and push the adjusted algorithm to the leaf for use with subsequent traffic flows. Thus, this feedback loop constantly adapts the load balancing algorithm with changing traffic conditions in the spine-leaf fabric.

Figure 2:
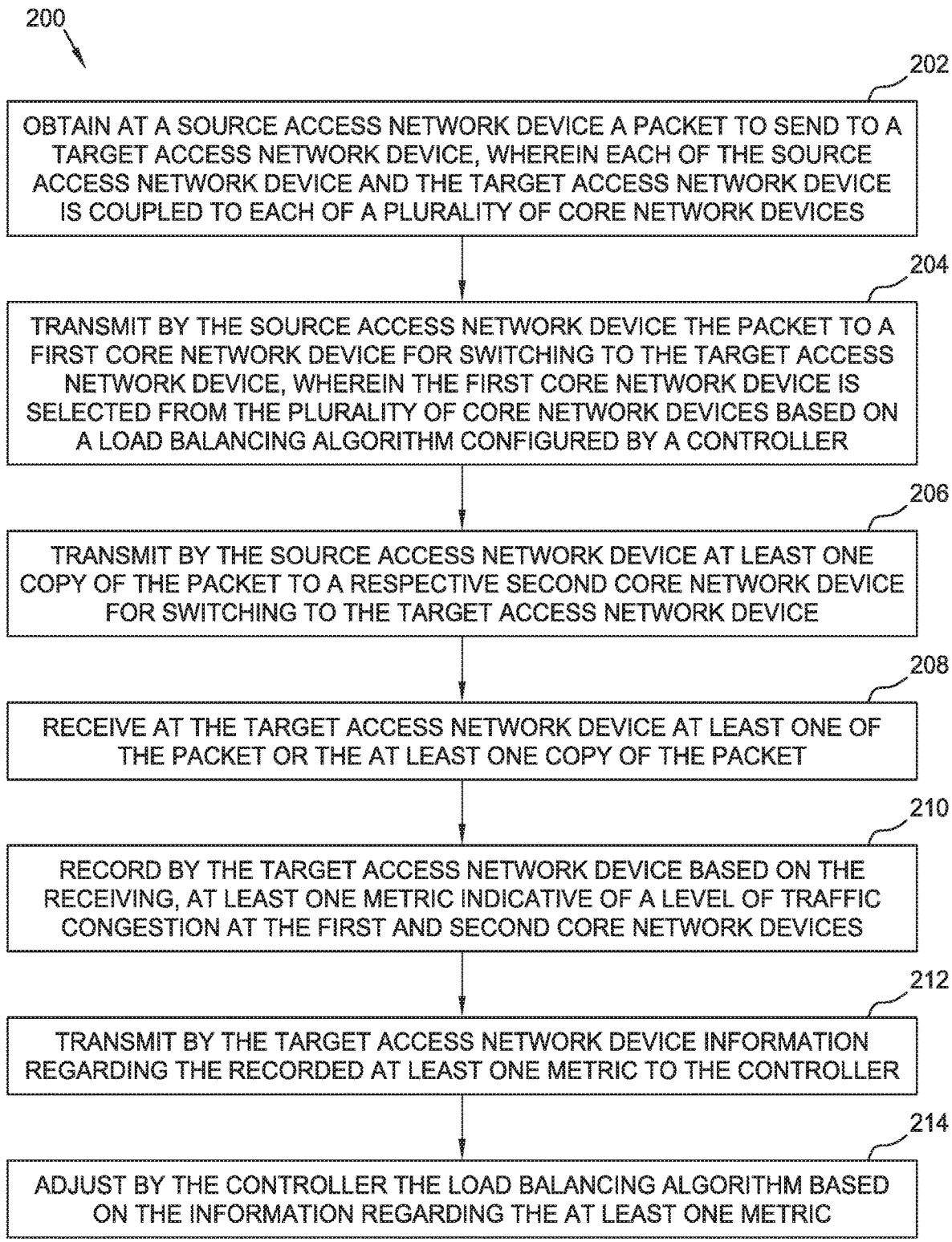
FIG. 2 illustrates example operations 200 for optimal selection of core network switches (e.g., spine switches) for switching traffic flows, in accordance with certain aspects of the present disclosure.

FIG. 2 illustrates example operations 200 for optimal selection of core network switches (e.g., spine switches) for switching traffic flows, in accordance with certain aspects of the present disclosure.

Operations 200 begin, at 202, by obtaining at a source access network device (e.g., a source leaf switch) a packet to send to a target access network device (e.g., a target leaf switch), wherein each of the source access network device and the target access network device is coupled to each of a plurality of core network devices (e.g., spine switches).

At 204, the source access network device transmits the packet to a first core network device for switching to the target access network device, wherein the first core network device is selected from the plurality of core network devices based on a load balancing algorithm configured by a controller.

At 206, the source access network device also transmits at least one copy of the packet to a respective second core network device for switching to the target access network device.

At 208, the target access network device receives at least one of the packet or the at least one copy of the packet, for example, from the respective first or second core network devices.

At 210, the target access network device records and/or generates based on the receiving, at least one metric indicative of a level of traffic congestion at the first and second core network devices.

At 212, the target access network device transmits information regarding the recorded at least one metric to the controller.

At 214, the controller adjusts the load balancing algorithm based on the information regarding the at least one metric.

In an aspect, the source access network device transmits at least one subsequent packet based on the adjusted load balancing algorithm.

In an aspect, transmitting copies of the packet to multiple core network devices (instead of a single core network switch), collecting metrics for the multiple core network switches and obtaining feedback regarding their level of traffic congestion allows for a more comprehensive testing of the spine for traffic load.

In certain aspects, two different methods may be used to test the system. In one method, actual traffic between leaf nodes is leveraged to test the system for load. In a second method, specific operations, administration and maintenance (OAM) frames are generated and transmitted from a source leaf to a target leaf via the spine to test the system.

Figure 3A:
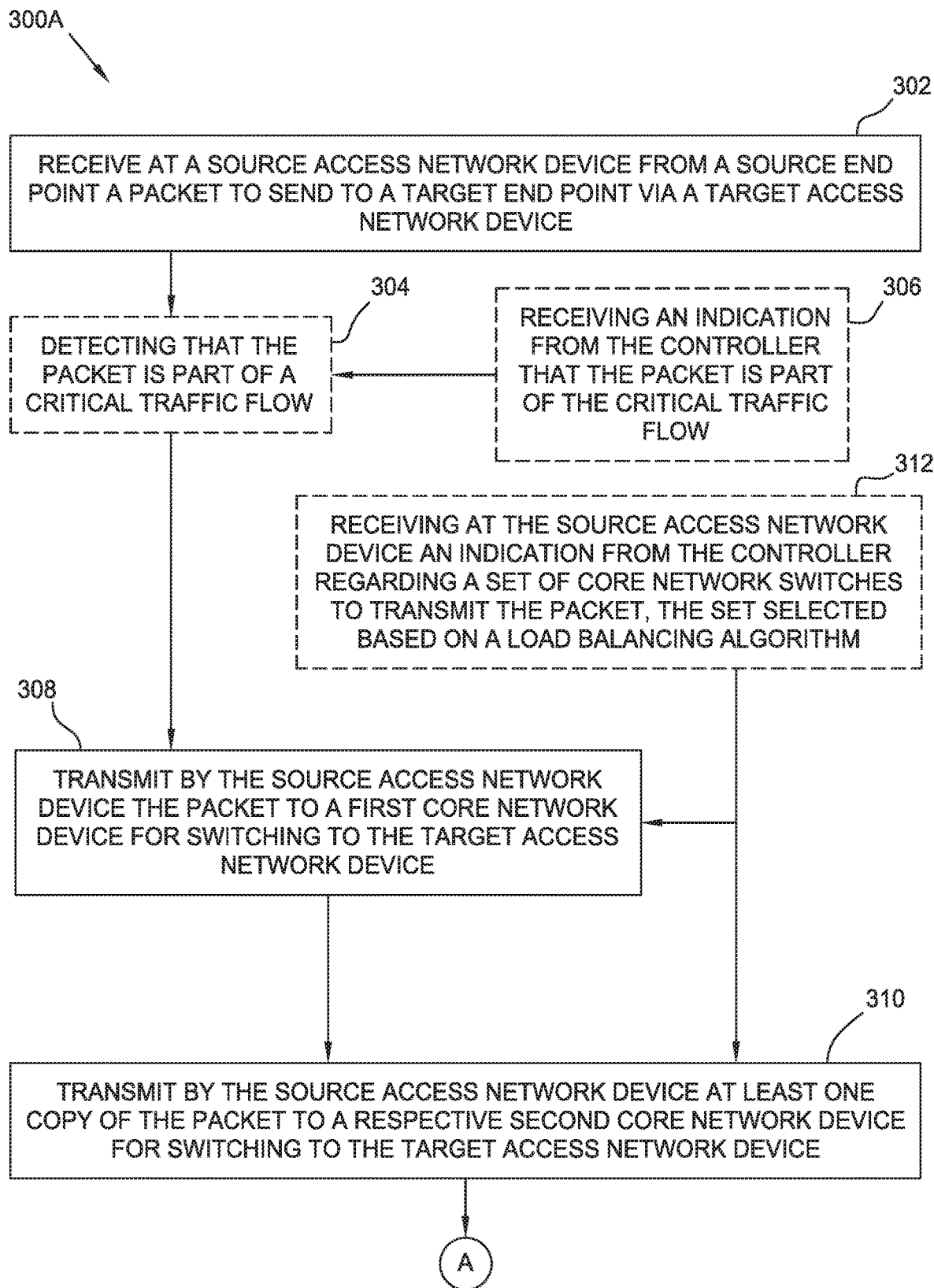
FIGS. 3A and 3B illustrate example operations 300A and 300B respectively for optimal selection of core network switches (e.g., spine switches) using actual traffic between access switches (e.g., leaf switches), in accordance with certain aspects of the present disclosure.
Figure 3B:
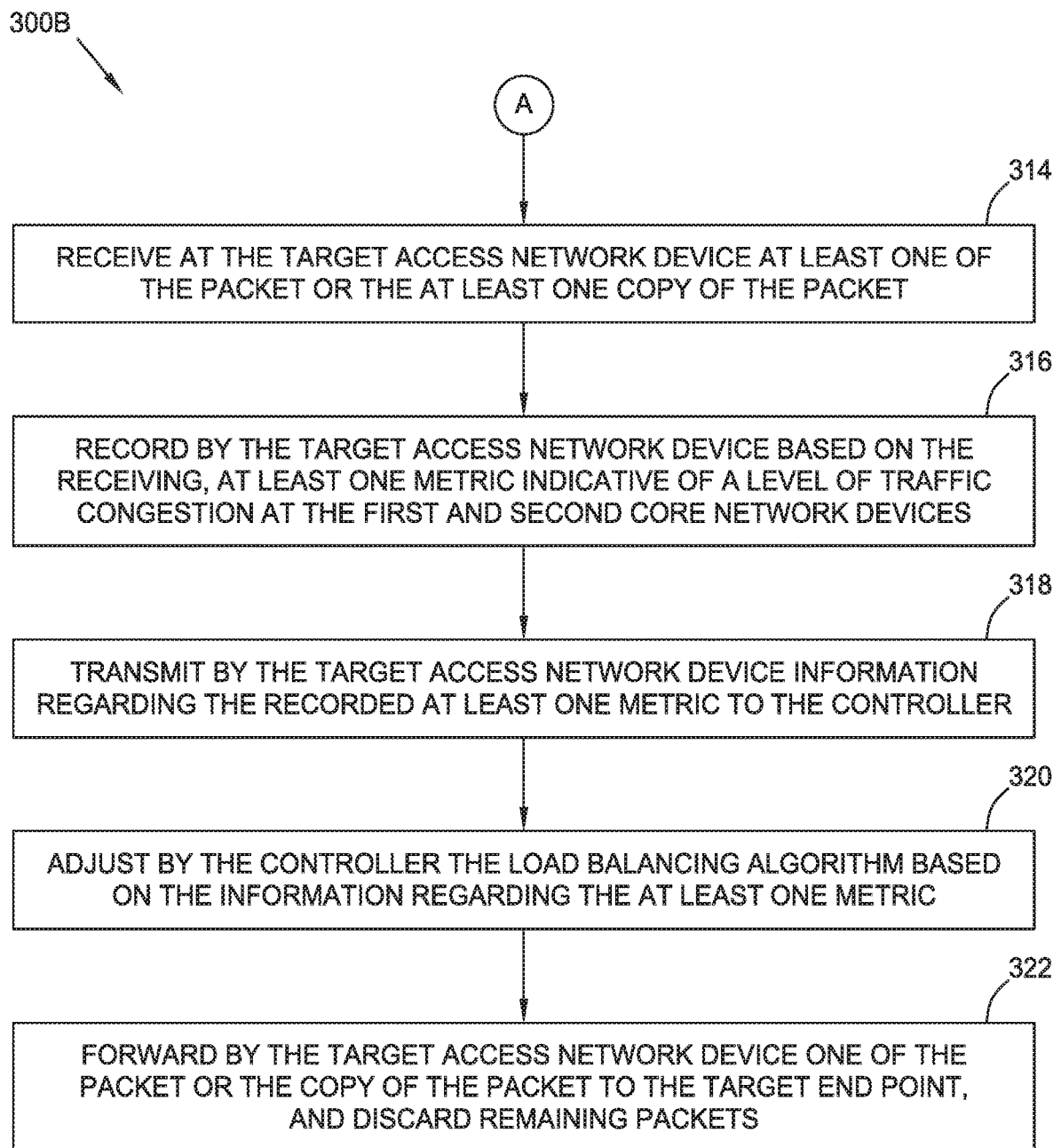
Figure 4:
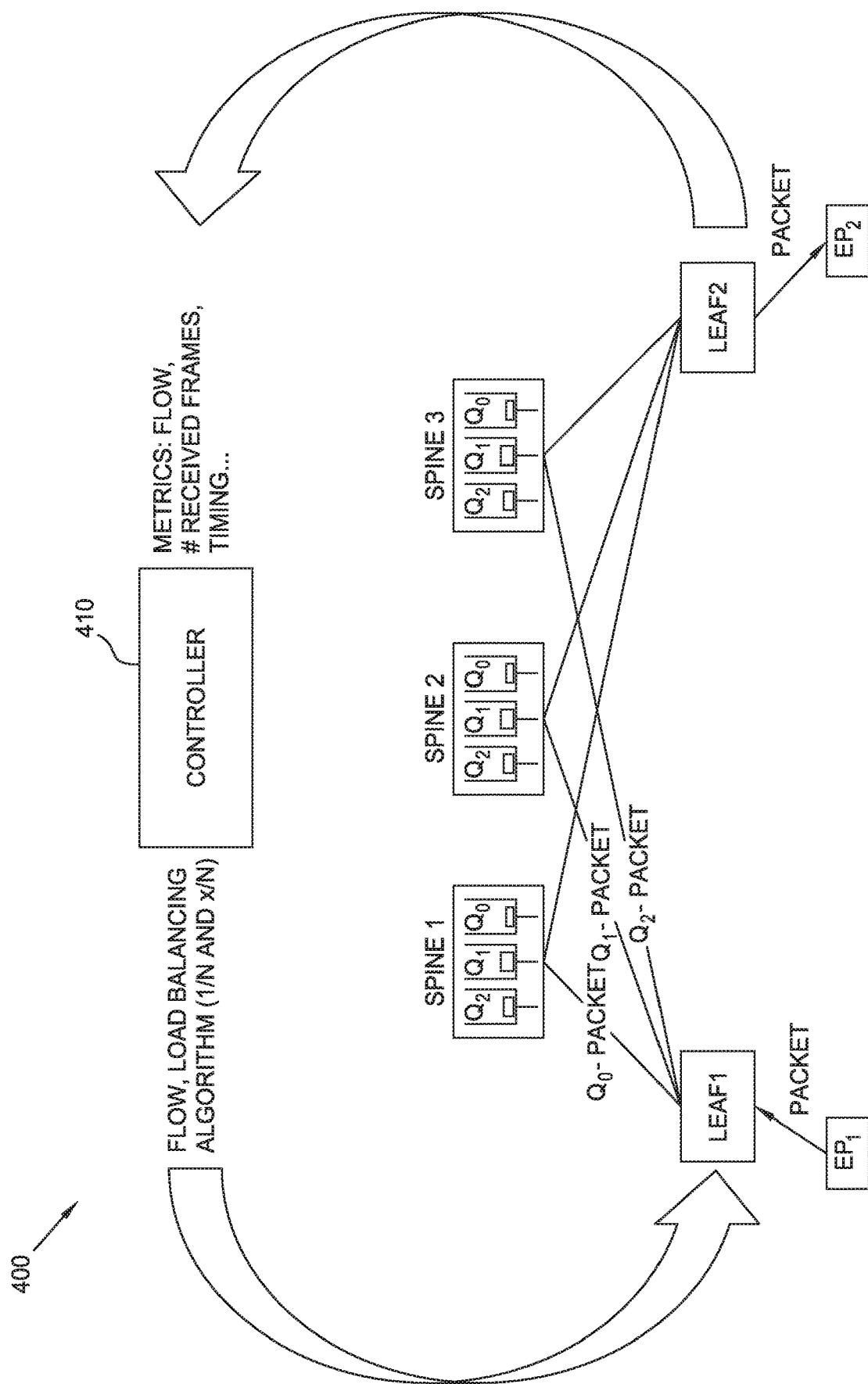
FIG. 4 illustrates an example spine-leaf network 400 that may implement operations 300A and 300B in FIGS. 3A and 3B for optimal selection of core network switches (e.g., spine switches) using actual traffic between access switches (e.g., leaf switches), in accordance with certain aspects of the present disclosure.

FIGS. 3A and 3B illustrate example operations 300A and 300B respectively for optimal selection of core network switches (e.g., spine switches) using actual traffic between access switches (e.g., leaf switches), in accordance with certain aspects of the present disclosure. FIG. 4 illustrates an example spine-leaf network 400 that may implement operations 300A and 300B in FIGS. 3A and 3B, in accordance with certain aspects of the present disclosure.

As shown in FIG. 4, the network 400 includes leaf switches leaf1 and leaf2, spine switches spine1, spine2 and spine3, and a controller 410. Each of leaf1 and leaf2 is coupled to each of the spine switches spine1, spine2 and spine3. End point EP1 is coupled to leaf1 and end point EP2 is coupled to leaf2. The controller 410 is a central entity that manages and configures policies on each of the leaf and spine switches in the leaf-spine fabric.

Operations 300A in FIG. 3A begin, at 302, with a source access network device receiving from a source end point a packet to send to a target end point via a target access network device. For example, leaf1 receives a packet (e.g., part of a traffic flow) from EP1 for transmitting to leaf2 via the spine (e.g., one or more of spine 1, 2 and 3). In certain aspects, leaf1 may optionally receive an indication from the controller 410 to test the network 400 for determining traffic load at the spine switches 1, 2, and 3. In an alternative aspect, leaf1 may be configured to perform operations to test the network 400 periodically or in response to detecting certain critical traffic flows.

Optionally, at 304, the source access network device detects that the packet received from the source end point is part of a critical traffic flow. For example, leaf1 detects that the packet received from EP1 is part of a critical traffic flow. Optionally, at 306, the source access network device may receive an indication from the controller that the packet is part of the critical traffic flow. For example, leaf1 receives an indication from the controller 410 that the packet is part of the critical traffic flow. In an alternative aspect, leaf1 is configured (e.g., by the controller 410) to detect certain critical flows and to trigger operations to test the network for load in response to the detection.

At 308, the source access network device transmits the packet to a first core network device (e.g., primary core switch) for switching to the target access network device. For example, leaf1 transmits the packet to one of the spine switches 1, 2, or 3 for switching to leaf2.

At 312, the source access network device also transmits at least one copy of the packet to a respective second core network device (e.g., secondary core switch) for switching to the target access network device. For example, leaf1 replicates the packet and transmits a copy of the packet to at least one of the remaining spine switches 1, 2, or 3 for switching to leaf2. Put differently, the source access network device transmits the same packet to at least two of the core network devices.

Optionally, at 310, the source access network device receives an indication from the controller regarding a set of core network switches to transmit the packet, the set selected based on a load balancing algorithm. For example, leaf1 receives an indication from the controller regarding a set of core network switches (e.g., a subset of spine switches 1, 2, and 3 including the primary spine switch and one or more secondary switches) to transmit the packet. In an aspect, the indication from the controller indicates which spine switch included in the set is a primary spine switch. The remaining spine switches in the set are secondary spine switches. In an aspect, the controller pushes the load balancing algorithm to the leaf switches (e.g., leaf 1 and leaf2), and each leaf determines the set of spine switches including primary and second switches based on the load balancing algorithm. In an aspect, the controller determines the set of spine switches based on the load balancing algorithm and sends an indication of the set to the leaf switches.

In certain aspect, leaf1 tags each packet with a priority (e.g., priorities 0-$n$, where n is the number of spine switches in the set selected based on the load balancing algorithm), wherein the highest priority (e.g., 0) is assigned to the packet transmitted to the primary spine switch. Lower priorities (e.g., 1-$n$) are assigned to copies of the packet transmitted to the secondary spine switches from the set. In an aspect, a priority (e.g., 1-$n$) assigned to each secondary spine switch is determined by the load balancing algorithm. In an aspect, each packet is also tagged with an identifier of the spine switch it is transmitted to. In an aspect, each spine switch maintains n priority queues, wherein each queue corresponds to packets tagged with a particular priority (e.g., 0-$n$). For example, as shown in FIG. 4, each of the spine switches 1, 2 and 3 maintains three priority queues $Q_0$, $Q_1$ and $Q_2$ queueing packets tagged with priorities 0, 1, and 2 respectively.

As shown in FIG. 4, leaf1 transmits a copy of the packet received from EP1 to each of the spine switches 1, 2, and 3. This means that the set of spine switches determined based on the load balancing algorithm includes all three spine switches 1, 2, and 3. It may be noted that the set of spine switches may not include all spine switches in which case leaf1 transmits packets to a subset of spine switches selected based on the load balancing algorithm. As shown, leaf1 transmits a packet tagged with the highest priority 0 to spine1, transmits a packet tagged with the next lower priority 1 to spine 2, and transmits a packet tagged with the lowest priority 2 to spine 3.

In certain aspects, each spine switch switches packets based on their priority tags. For example, each spine switch switches packets with a higher priority first. Thus, a spine switch will not switch a packet tagged with a lower priority if it has packets to be transmitted in a higher priority queue. Thus, each spine switch switches packets from $Q_0$ first. When $Q_0$ is empty, the spine switch may switch packets from $Q_1$, and when $Q_1$ is empty, it may switch packets from $Q_2$.

In certain aspects, the spine switch receiving a priority #0 tagged packet switches the packet right away if it is not busy, for example, serving other packets from $Q_0$ (i.e., Q0 is not empty). If the spine switch is already transmitting another packet, it looks at the tag of the packet being transmitted, and if the packet is tagged with a lower priority (1 to n), it aborts the transmission (or preempts the transmission using a protocol like IEEE 8021.1Qbu), and transmits the new packet instead. If the spine switch is busy transmitting another packet with a priority #0 tag, it queues the new packet into the queue $Q_0$ (top priority queue) and transmits packets from $Q_0$ on a first come first served basis. As noted above, the spine switch then transmits contents of the queues, from highest to lowest priority, provided they are not too old. In an aspect, the spine switch drops packets that are too old.

In certain aspects, at least for flows that are used to test the network load, only packets tagged with the highest priority 0 are allowed to be queued at the spine switches. For these flows, packets tagged with lower priority queues (e.g., 1-$n$) are not allowed to be queued at the spine switches. This means, when a packet tagged with a lower priority 0-$n$ reaches a spine switch and the switch is busy servicing a higher priority queue (e.g., priority $Q_0$ is not empty) or has same priority packets waiting to be transmitted in its respective lower priority queue, the packet is dropped and not queued in the respective lower priority queue at the spine switch. In alternative aspects, packets tagged with lower priorities #1-$n$ are allowed to be queued at the spine switches. For example, a spine switch receiving a lower priority packet transmits the packet right away if the spine switch does not have any higher priority packets or same priority packets to transmit. If the spine switch already has packets with the same priority as the new packet queued up, the new packed it queued in the respective priority queue at the spine switch. For example, a switch receiving a packet tagged with priority #1 switches it right away if the switch's Q0 and Q1 are empty. If, either of Q0 or Q1 has packets waiting to be transmitted the new packet is queued in Q1 and the spine switches transmits the packets from highest to lowest priorities.

At 314 in FIG. 3B, the target access network device receives at least one of the packet or the at least one copy of the packet. For example, leaf2 receives at least one copy of the packet from the spine switches 1, 2 and 3.

At 316, the target access network device, based on the receiving, records at least one metric indicative of a level of traffic congestion at the first and second core network devices. For example, leaf2, based on the received packets records metrics regarding the spine switches 1, 2, and 3. The metrics include information regarding which of the spine switches successfully forwarded its copy of the packet, packets from which spine switches got delayed and by how much, or spine switches that dropped their respective packets (e.g., based on packets not received from certain spine switches).

For example, when the spine switches start to get busy, the #0 tagged packet may not be switched right away by spine1, while the spine2 that received the #1 packet may be less busy, and may switch its copy of the packet as a #1 packet immediately. In this example, leaf2 records that a #1 tagged packet arrived before #0 tagged packet, which suggests that spine1 that switched the #0 packet was too busy.

At 318, the target access network device transmits information regarding the recorded at least one metric to the controller. For example, leaf2 transmits the controller 410 information regarding the recorded metrics regarding the spine switches.

At 320, the controller adjusts the load balancing algorithm based on the information regarding the at least one metric. For example, the controller 410 adjusts the load balancing algorithm based on the information received from leaf2 regarding the loading of spine switches. The adjusted load balancing algorithm may be used for selecting a more optimal set of spine switches for subsequent packets in the traffic flow.

In certain aspects, when leaf1 starts testing the network for a new traffic flow, initially for a first or a first few packets of the flow, the spine switches may be selected randomly or based on a legacy or traditional load balancing algorithm. However, as the network is tested based on the first or first few packets using the feedback loop, after some time the log at the controller contains the flow characteristics, the switches that successfully forwarded packets, the packets that got delayed, the switches that dropped packets, together with some time stamp, and macroscopic information such as the applications running through the fabric, etc. This log may be used to adjust the load balancing algorithm and the adjusted load balancing algorithm may be used to select a more optimal set of spine switches and corresponding priorities for subsequent packets of the traffic flow.

At 322, the target access network device forwards one of the packet or the copy of the packet to the target end point, and discards remaining packets. For example, leaf2 may receive multiple copies of the packet from different spine switches 1, 2, and/or 3. Leaf2 forwards only one of the received packets (e.g., the first received packet) to EP2 and discards all other received copies of the packet.

As noted above, OAM frames with certain characteristics (e.g., length etc.) may be generated and transmitted by a source leaf to a target leaf via the spine to test the system.

Figure 5A:
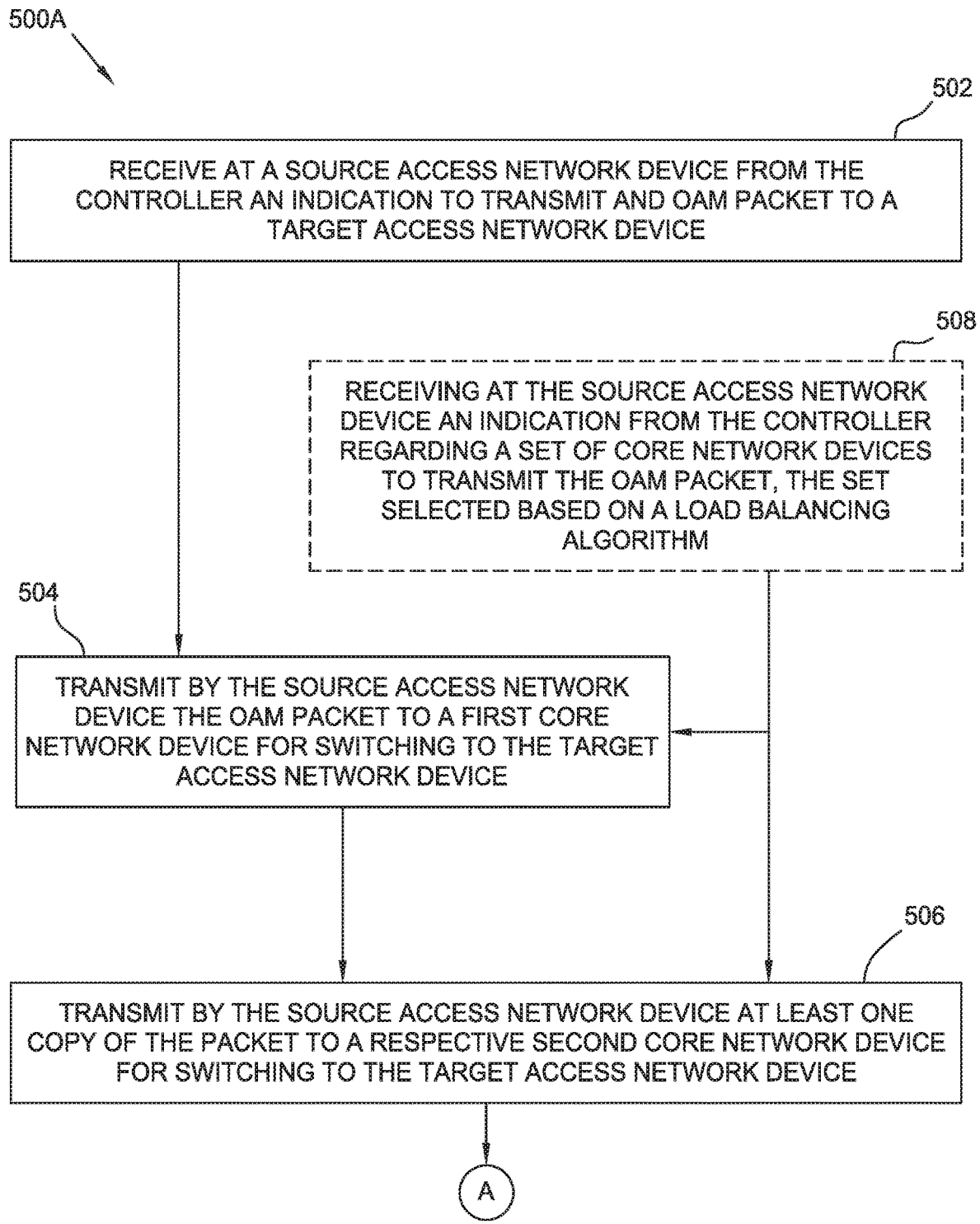
FIGS. 5A and 5B illustrate example operations 500A and 500B respectively for optimal selection of core network switches (e.g., spine switches) using OAM traffic between access switches (e.g., leaf switches), in accordance with certain aspects of the present disclosure.
Figure 5B:
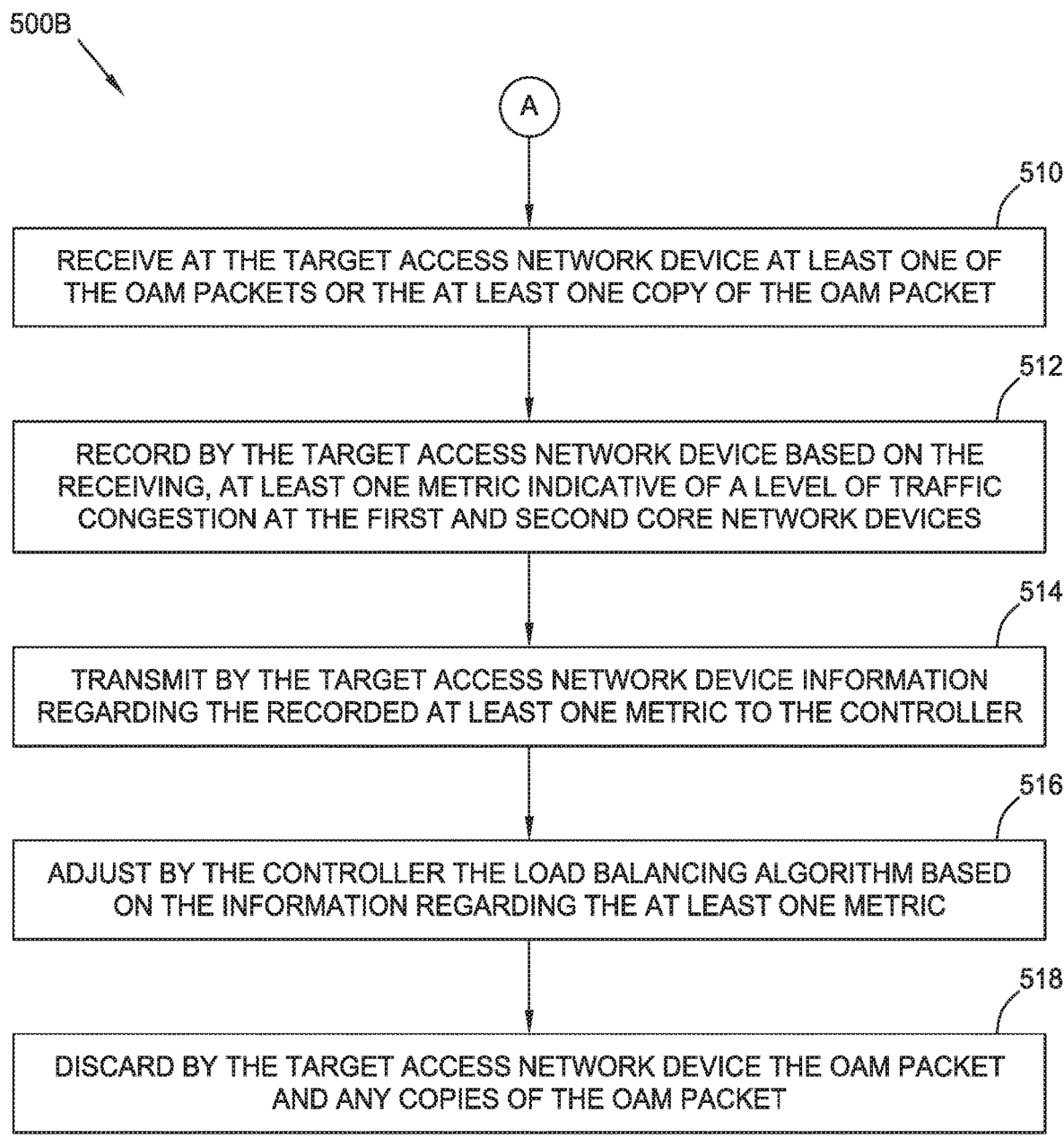
Figure 6:
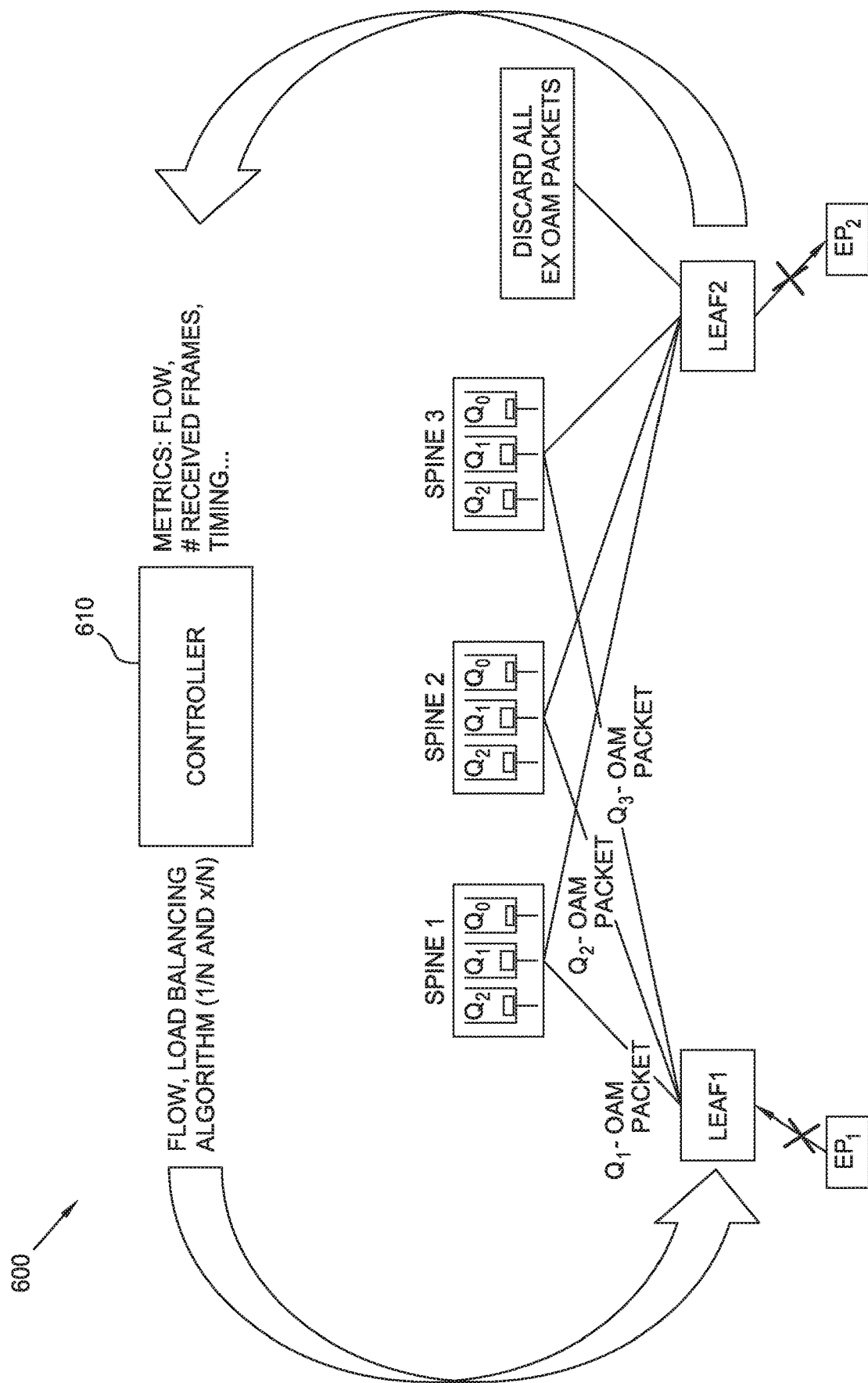
FIG. 6 illustrates an example spine-leaf network 600 that may implement operations 500A and 500B in FIGS. 5A and 5B for optimal selection of core network switches (e.g., spine switches) using OAM traffic between access switches (e.g., leaf switches), in accordance with certain aspects of the present disclosure.

FIGS. 5A and 5B illustrate example operations 500A and 500B respectively for optimal selection of core network switches (e.g., spine switches) using OAM traffic between access switches (e.g., leaf switches), in accordance with certain aspects of the present disclosure. FIG. 6 illustrates an example spine-leaf network 600 that may implement operations 500A and 500B in FIGS. 5A and 5B, in accordance with certain aspects of the present disclosure.

As shown in FIG. 6, the network 600 includes leaf switches leaf1 and leaf2, spine switches spine1, spine2 and spine3, and a controller 610. Each of leaf1 and leaf2 is coupled to each of the spine switches spine1, spine2 and spine3. End point EP1 is coupled to leaf1 and end point EP2 is coupled to leaf2. The controller 610 is a central entity that manages and configures policies on each of the leaf and spine switches in the leaf-spine fabric.

Operations 500A in FIG. 5A begin, at 502, with a source access network device receiving from a controller an indication to transmit an OAM packet to a target access network device. For example, leaf1 receives an indication from controller 610 to transmit an OAM packet (e.g., part of an OAM traffic flow) to leaf2 via the spine (e.g., one or more of spine 1, 2 and 3). In certain aspects, the indication from the controller 610 is to test the network 600 for determining traffic load at the spine switches 1, 2, and 3. In an alternative aspect, leaf1 may test the network 400 using OAM traffic periodically.

At 504, the source access network device transmits the OAM packet to a first core network device (e.g., primary core switch) for switching to the target access network device. For example, leaf1 transmits the OAM packet to one of the spine switches 1, 2, or 3 for switching to leaf2.

At 506, the source access network device transmits at least one copy of the OAM packet to a respective second core network device (e.g., secondary core switch) for switching to the target access network device. For example, leaf1 replicates the OAM packet and transmits a copy of the OAM packet to at least one of the remaining spine switches 1, 2, or 3 for switching to leaf2.

Optionally, at 508, the source access network device receives an indication from the controller regarding a set of core network switches to transmit the OAM packet, the set selected based on a load balancing algorithm. For example, leaf1 receives an indication from the controller regarding a set of core network switches (e.g., a subset of spine switches 1, 2, and 3 including the primary spine switch and one or more secondary switches) to transmit the OAM packet. In an aspect, the indication from the controller indicates of which spine switch included in the set is a primary spine switch. The remaining spine switches in the set are secondary spine switches. In an aspect, the controller pushes the load balancing algorithm to the leaf switches (e.g., leaf 1 and leaf2), and each leaf determines the set of spine switches including primary and second switches based on the load balancing algorithm. In an aspect, the controller determines the set of spine switches based on the load balancing algorithm and sends an indication of the set to the leaf switches.

In certain aspect, leaf1 tags each packet with a priority (e.g., priorities 0-$n$, where n is the number of spine switches in the set selected based on the load balancing algorithm), wherein the highest priority (e.g., 0) is assigned to the packet transmitted to the primary spine switch. Lower priorities (e.g., 1-$n$) are assigned to copies of the packet transmitted to the secondary spine switches from the set. In an aspect, a priority (e.g., 1-$n$) assigned to each secondary spine switch is determined by the load balancing algorithm. In an aspect, each packet is also tagged with an identifier of the spine switch it is transmitted to. In an aspect, each spine switch maintains n priority queues, wherein each queue corresponds to packets tagged with a particular priority (e.g., 0-$n$). For example, as shown in FIG. 6, each of the spine switches 1, 2 and 3 maintains three priority queues $Q_0$, $Q_1$ and $Q_2$ queueing packets tagged with priorities 0, 1, and 2 respectively.

As shown in FIG. 6, leaf1 transmits a copy of the OAM packet received from EP1 to each of the spine switches 1, 2, and 3. This means that the set of spine switches determined based on the load balancing algorithm includes all three spine switches 1, 2, and 3. It may be noted that may not include all spine switches in which case leaf1 transmits packets to a subset of spine switches selected based on the load balancing algorithm. As shown, leaf1 transmits a packet tagged with the highest priority 0 to spine1, transmits a packet tagged with the next lower priority 1 to spine 2, and transmits a packet tagged with the lowest priority 2 to spine 3.

In certain aspects, each spine switch switches packets based on their priority tags. For example, each spine switch switches packets with a higher priority first. Thus, a spine switch will not switch a packet tagged with a lower priority if it has packets to be transmitted in a higher priority queue. Thus, each spine switch switches packets from $Q_0$ first. When $Q_0$ is empty, the spine switch may switch packets from $Q_1$, and when $Q_1$ is empty, it may switch packets from $Q_2$.

In certain aspects, the spine switch receiving a priority #0 tagged packet switches the packet right away if it is not busy, for example, serving other packets from $Q_0$ (i.e., Q0 is not empty). If the spine switch is already transmitting another packet, it looks at the tag of the packet being transmitted, and if the packet is tagged with a smaller priority (1 to n), it aborts the transmission (or preempts the transmission using a protocol like IEEE 8021.1Qbu), and transmits the new packet instead. If the spine switch is busy transmitting another packet with a priority #0 tag, it queues the new packet into the queue $Q_0$ (top priority queue) and transmits packets from $Q_0$ on a first come first served basis. As noted above, the spine switch then transmits contents of the queues, from highest to lowest priority, provided they are not too old. In an aspect, the spine switch drops packets that are too old.

In certain aspects, at least for flows that are used to test the network load, only packets tagged with the highest priority 0 are allowed to be queued at the spine switches. For these flows, packets tagged with lower priority queues (e.g., 1-$n$) are not allowed to be queued at the spine switches. This means, when a packet tagged with a lower priority 0-$n$ reaches a spine switch and the switch is busy servicing a higher priority queue (e.g., priority $Q_0$ is not empty) or has same priority packets waiting to be transmitted in its respective lower priority queue, the packet is dropped and not queued in the respective lower priority queue at the spine switch. In alternative aspects, packets tagged with lower priorities #1-$n$ are allowed to be queued at the spine switches. For example, a spine switch receiving a lower priority packet transmits the packet right away if the spine switch does not have any higher priority packets or same priority packets to transmit. If the spine switch already has packets with the same priority as the new packet queued up, the new packed it queued in the respective priority queue at the spine switch. For example, a switch receiving a packet tagged with priority #1 switches it right away if the switch's Q0 and Q1 are empty. If, either of Q0 or Q1 has packets waiting to be transmitted the new packet is queued in Q1 and the spine switches transmits the packets from highest to lowest priorities.

At 510 in FIG. 5B, the target access network device receives at least one of the OAM packet or the at least one copy of the OAM packet. For example, leaf2 receives at least one copy of the OAM packet from the spine switches 1, 2 and 3.

At 512, the target access network device, based on the receiving, records at least one metric indicative of a level of traffic congestion at the first and second core network devices. For example, leaf2, based on the received OAM packets records metrics regarding the spine switches 1, 2, and 3. The metrics include information regarding which of the spine switches successfully forwarded its copy of the packet, packets from which spine switches got delayed any by how much, spine switches that dropped their respective packets (e.g., based on packets not received from certain spine switches).

At 514, the target access network device transmits information regarding the recorded at least one metric to the controller. For example, leaf2 transmits the controller 610 information regarding the recorded metrics regarding the spine switches.

At 516, the controller adjusts the load balancing algorithm based on the information regarding the at least one metric. For example, the controller 610 adjusts the load balancing algorithm based on the information received from leaf2 regarding the loading of spine switches. The adjusted load balancing algorithm may be used for selecting a more optimal set of spine switches for subsequent packets in the OAM traffic flow or for other subsequent traffic flows between leaf1 and leaf2.

At 518, the target access network device discards the OAM packet and any copies of the OAM packet. For example, leaf2 may receive multiple copies of the OAM packet from different spine switches 1, 2, and/or 3. Leaf2 discards all received OAM packets after recording the metrics.

In certain aspects, certain measures may be taken to ensure that there is no undue performance degradation due to the load testing techniques described above and to ensure that the system may be easily scaled.

In certain aspects, the multicasting/dropping of the packets/frames may not happen on all frames, and not all the time. In an aspect, leaf switches may regularly send OAM multicast frames over a selection of core switches (that will all be dropped on the egress leaf switches) while keeping OAM well under the actual rate of regular frames unicasted through the fabric. When using regular traffic (in which case one of the copies of the packet won't be dropped), the network is tested only when instructed by the controller, and only for a short period of time. Thus, the percentage of multicast frames may remain low compared to the over fabric throughput, reducing the negative impact.

In certain aspects, another solution is to use "Network coding". When a frame X is selected to be replicated (multicast), it is split into smaller chunks, for example, as many as core switches to-be-tested minus n (say n=1). Forward Error Correction (FEC) may be achieved by generating n additional chunks. The original chunks and the FEC chunks may be sent in parallel over ECMP, which streamlines the forwarding and enables to explore all links in parallel.

To illustrate this mechanism, let's take a simple example with three core switches, n=1, and hence two chunks of equal size, a and b (X=a+b). The source leaf transmits a, b, and c (c=a XOR b) towards the 3 switches. At the egress, assuming one chunk could have been dropped due to congestion, it would get only a,b or a,c or b,c. In the three cases, the egress leaf may rebuild the complete frame X by XORing c with either a or b. In this example, if the original frame was 1000 bytes, so no more than only 1500 bytes are being sent instead of 3000 in full-replication approach. In an aspect, more are the core switches, the smaller is the overhead.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for switching data in a communication network, comprising:
   obtaining at a source access network device a packet to send to a target access network device, wherein each of the source access network device and the target access network device is coupled to each of a plurality of core network devices;
   transmitting by the source access network device the packet to a first core network device for switching to the target access network device, wherein the first core network device is selected from the plurality of core network devices based on a load balancing algorithm configured by a controller;
   transmitting by the source access network device at least one copy of the packet to a respective second core network device for switching to the target access network device;
   receiving at the target access network device at least one of the packet or the at least one copy of the packet;
   generating by the target access network device based on the receiving, at least one metric indicative of a level of traffic congestion at the first and second core network devices;
   transmitting by the target access network device information regarding the at least one metric to the controller; and
   adjusting by the controller the load balancing algorithm based on the at least one metric.

2. The method of claim 1, further comprising transmitting by the source access network device at least one subsequent packet based on the adjusted load balancing algorithm.

3. The method of claim 1, further comprising receiving at the source access network device the packet from a source end point device for transmitting to a target end point device coupled to the target access network device.

4. The method of claim 3, further comprising, after receiving at least one of the packet or the at least one copy of the packet, (i) forwarding by the target access network device one of the packet or the at least one copy of the packet to the target end point device and (ii) discarding the other packet.

5. The method of claim 1, further comprising:
   detecting that the packet is part of a critical traffic flow; and
   wherein the transmitting by the source access network device the packet and the at least one copy of the packet is in response to detecting that the packet is part of the critical traffic flow.

6. The method of claim 5, further comprising receiving by the source access network device from the controller an indication of the critical traffic flow.

7. The method of claim 1, wherein the packet is part of operations, administration and maintenance (OAM) traffic.

8. The method of claim 7, further comprising, after receiving at least one of the packet or the at least one copy of the packet, discarding the packet and the at least one copy of the packet.

9. The method of claim 1, further comprising receiving at the source access network device a first indication from the controller to transmit the packet to the first core network device, wherein the first indication is based on the load balancing algorithm.

10. The method of claim 9, further comprising receiving at the source access network device a second indication from the controller to transmit the at least one copy of the packet to the respective second core network device, wherein the second indication is based on the load balancing algorithm.

11. The method of claim 1, wherein the respective second core network device is selected based on a random algorithm.

12. The method of claim 1, further comprising replicating by the source access network device the packet using a redundancy protocol to generate the at least one copy of the packet.

13. The method of claim 1, further comprising:
    tagging by the source access network device the packet with a highest priority; and
    tagging by the source access network device the at least one copy of the packet with a lower priority.

14. The method of claim 13, wherein each of the plurality of core network devices is configured to switch packets from highest to lowest priorities.

15. A communication network for switching data, comprising:
    a controller for managing switching of traffic flows in the communication network;
    a plurality of core network devices;
    a source access network device; and
    a target access network device, wherein each of the source access network device and the target access network device is coupled to each of a plurality of core network devices,
    wherein the source access network device is configured to:
        obtain a packet to send to the target access network device,
        transmit the packet to a first core network device for switching to the target access network device, wherein the first core network device is selected from the plurality of core network devices based on a load balancing algorithm configured by a controller, and
        transmit at least one copy of the packet to a respective second core network device for switching to the target access network device,
    wherein the target access network device is configured to:
        receive at least one of the packet or the at least one copy of the packet, generate based on the receiving, at least one metric indicative of a level of traffic congestion at the first and second core network devices, and transmit information regarding the at least one metric to the controller, wherein the controller is configured to adjust the load balancing algorithm based on the at least one metric.

16. The communication network of claim 15, wherein the source access network device is further configured to transmit at least one subsequent packet based on the adjusted load balancing algorithm.

17. The communication network of claim 15, further comprising:

a source end point device coupled to the source access network device; and a target end point device coupled to the target access network device, wherein the source access network device is further configured to receive the packet from a source end point device for transmitting to the target end point device.

18. The communication network of claim 17, wherein, after receiving at least one of the packet or the at least one copy of the packet, the target access network device is further configured to forward one of the packet or the at least one copy of the packet to the target end point device and discard the other packet.

19. The communication network of claim 15, wherein the packet is part of operations, administration and maintenance (OAM) traffic.

20. An apparatus for switching data in a communication network, comprising:

means for obtaining at a source access network device a packet to send to a target access network device, wherein each of the source access network device and the target access network device is coupled to each of a plurality of core network devices;

means for transmitting by the source access network device the packet to a first core network device for switching to the target access network device, wherein the first core network device is selected from the plurality of core network devices based on a load balancing algorithm configured by a controller;

means for transmitting by the source access network device at least one copy of the packet to a respective second core network device for switching to the target access network device;

means for receiving at the target access network device at least one of the packet or the at least one copy of the packet;

means for generating by the target access network device based on the receiving, at least one metric indicative of a level of traffic congestion at the first and second core network devices;

means for transmitting by the target access network device information regarding the at least one metric to the controller; and means for adjusting by the controller the load balancing algorithm based on the at least one metric.

* * * * *